United States Patent Office 3,775,309
Patented Nov. 27, 1973

3,775,309
COUNTERCURRENT CHROMATOGRAPHY WITH FLOW-THROUGH COIL PLANET CENTRIFUGE
Yoichiro Ito, Chevy Chase, and Robert L. Bowman, Bethesda, Md., assignors to the United States of America as represented by the Secretary of the Department of Health, Education, and Welfare
Filed July 27, 1972, Ser. No. 275,777
Int. Cl. B01d 15/08
U.S. Cl. 210—31 C
10 Claims

ABSTRACT OF THE DISCLOSURE

A method of countercurrent chromatography employs a vertical helical tube in a centrifugal field. The helical tube is arranged so that it does not rotate as it revolves, thus eliminating the need for rotating seals. Solutes introduced into the tube are subjected to a rapid partition process, resulting in an efficient chromatographic separation without the complications arising from solid supports.

FIELD OF THE INVENTION

The present invention relates to a flow-through coil planet centrifuge and a method of countercurrent chromatography employing such a centrifuge. More particularly, the present invention relates to a centrifuge which revolves a helical column around the axis of the centrifuge and yet maintains the column in a fixed orientation while it revolves.

BACKGROUND OF THE INVENTION

Separation processes in which two immiscible or partially soluble liquid phases are brought into contact for the transfer of one or more components are referred to as liquid-liquid extraction or solvent extraction. In the simplest case, when two immiscible solvents containing solute are shaken in a separatory funnel and then separated, the solutes are partitioned between the two phases. The ratio of solute concentration in the upper phase to the lower is called the partition coefficient. If the partition coefficients of the two substances differ greatly, the only process needed for separation is a one-step operation. As the nature of the substances become more similar, the difference in their partition coefficients decrease, hence requiring multi-step extraction or separation. When done in countercurrent fashion, this technique is called "the counter-current distribution method."

Another method of extraction is known as partition chromatography. This method involves a continuous partition process between moving and stationary phases. A variety of methods have developed for partition chromatography which employ solid supports such as cellulose, silica, alumina, or glass in order to hold one phase stationary. The granular and porous nature of the solid support provides an enormous surface area in relation to the liquid volume and divides the free space into thousands of "plates." In each "plate," the partition process is theoretically completed, thus yielding an efficiency as high as thousands of theoretical plates. However, the affinity of the solid supports for the solute can add an undesirable adsorption effect evidenced by tailing of the elution curves of the solutes. When one deals with a minute amount of biological components, adsorption can result in a significant loss or denaturation of samples in addition to contamination by foreign materials eluted from the support.

Another liquid-liquid extraction technique has also been developed which is known as countercurrent chromatography. This system is similar to the countercurrent distribution method in that the two immiscible phases pass through each other in a tubular space. However, it involves a continuous non-equilibrium partition process comparable to chromatography. It was developed to achieve a high efficiency chromatographic separation on both a preparative and analytical scale in the absence of solid supports. However, elimination of the solid support creates a number of problems as listed below:

(1) How to keep the stationary phase in the column as the moving phase is steadily eluted.
(2) How to divide the column space into numerous partition units and reduce laminar flow spreading of the sample bands.
(3) How to increase interfacial area.
(4) How to mix each phase to reduce mass transfer resistance.

Several arrangements of countercurrent chromatography have been developed. In each system, a tubular column is made to form multiple traps to hold the stationary phase in a segmented pattern while a gravitational or centrifugal force maintains the two-phase states. Relative interface area is increased by decreasing the tubular diameter and/or increasing the number of the phase segments per unit length of the column. In some cases, effective mixing is accomplished by rotational or gyrational motion of the column, while the interface is held stable by gravity or centrifugal force.

Several methods of countercurrent chromatography have been disclosed in the article by Ito and Bowman in "Journal of Chromatographic Science," vol. 8, pp. 315–323, June 1970. These methods include helix countercurrent chromatography, droplet countercurrent chromatography and rotation and gyration locular countercurrent chromatography.

In helix countercurrent chromatography, a horizontal helical tube is filled with one phase of a two-phase liquid system. The other phase is introduced at one end of the helix and passes through the first phase according to the vertical direction of flow resulting in alternate segments of the two phases. Continued flow causes displacement of the second phase only with respect to the stationary first phase. A liquid-liquid partition chromatographic system is thus established. Solutes introduced to either phase will undergo separation according to their relative partition coefficients in a manner analogous to that of conventional liquid-liquid chromatography but in the absence of a solid support. The force of gravity holds the lower phase stationary while the upper phase is forced therethrough. To enable the countercurrent process to take place inside a very small diameter tube having a maximum of turns, the enhancement of the gravitational field is necessitated. This is achieved by the use of a centrifuge.

In an article by Ito et al. in Analytical Chemistry, vol. 41, pp. 1579–1584, October 1969, such a helix countercurrent chromatography method is described using a coil planet centrifuge. This apparatus induces a planetary motion to a helical tube in a manner such that the rotation of the helical tube is extremely slow in comparison with the revolution. In such a system, however, flow becomes difficult because of the need for the rotating seals; therefore, the separation is usually performed within a closed helical tube. Thus, problems of sample introduction and fractionation limit the practical use of the method.

SUMMARY OF THE INVENTION

The present invention introduces a continuous flow-through system to the coil planet centrifuge without rotating seals. The entire helix revolves around the axis of the centrifuge but it is not permitted to rotate with respect to this axis. The fixed orientation of the helix is maintained by coupling a pulley on the helix holder through a toothed belt to a stationary pulley of equal diameter on the axis of the centrifuge drive. This coupling causes a counter-rotation of the helix to cancel out the rotation of the helix induced by its revolution. Since the orientation of the helix remains constant, the feed and return tubes do not twist and it is not necessary to use a rotating seal. Accordingly, it is an object of the present invention to obviate the problems of the prior art such as discussed hereinabove.

It is another object of the present invention to provide improved liquid-liquid extraction.

It is another object of the present invention to provide a novel method and apparatus for countercurrent chromatrography.

It is a further object of the present invention to provide a system of countercurrent chromatography which eliminates the need for rotating seals.

These and other objects will become more obvious in conjunction with the drawing and the following detailed description of an embodiment,[1] presented in an exemplary rather than limitative manner for a better understanding of the invention.

DESCRIPTION OF THE PREFERRED EMBODIMENTS

Figure 2:
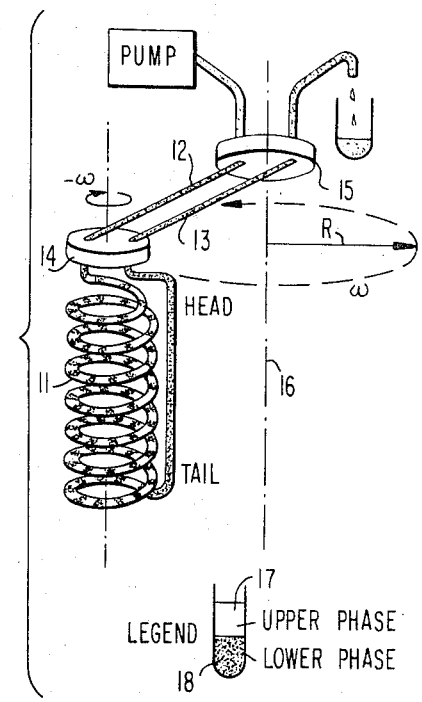
FIG. 2 is a diagrammatical representation of the operation of the centrifuge in accordance with the present invention.
Figure 3:
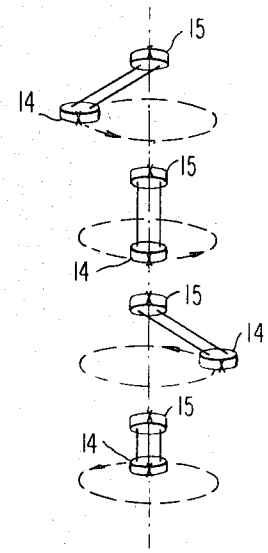
FIG. 3 is a diagrammatical view showing the rotation of the centrifuge of the present invention.

FIGS. 2 and 3 illustrate the general principle of the present invention. The separation coil is a helix 11 formed of a plurality of coils as indicated in FIG. 2. A pair of flexible feed and return tubes 12 and 13 are supported by a moving support, e.g., a disc 14, located at the top or head end of the helix 11, and by a suitable stationary support, e.g. disc 15, fixed to the center of the upper frame of the centrifuge (not shown).

The entire helix 11 and the moving disc 14 revolve around the axis of the centrifuge 16 but they are not permitted to rotate with respect to the stationary disc 15. The fixed orienation of the helix 11 is maintained by a coupling which will be discussed in detail hereinbelow. This coupling causes a counter-rotation ($-\omega$) of the helix 11 to cancel out the rotation ($\omega$) of the helix 11 induced by its revolution. The feed and return tubes 12 and 13 do not twist because the moving disc 14 does not rotate with respect to the stationary disc 15 as indicated in FIG. 3 by the position of the X marks shown in successive positions of the relation between the stationary and moving discs 15 and 14. Because the helical column 11 maintains a fixed orientation while it revolves, the radially directed centrifugal force rotates with respect to the column.

Figure 4:
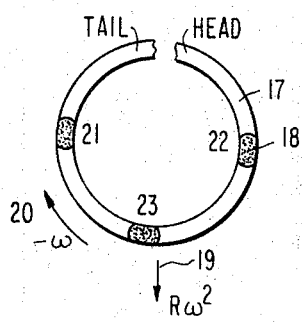
FIGS. 4, 5 and 6 are diagrammatic views showing the motion of the two immiscible phases confined in one coil of the centrifuge of the present invention.
Figure 6:
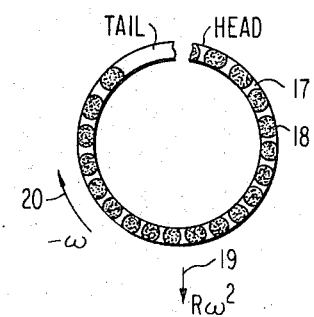
Figure 5:
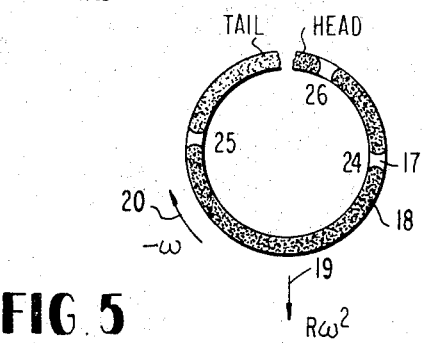

Schematic FIGS. 4, 5 and 6 show the principle of relative motion of the two immiscible phases, the upper phase 17 and the lower phase 18, as if they were confined in a tube such as the helix 11 without the external introduction of flow. For the convenience of illustration and simplicity, however, the direction of the centrifugal force 19, which actually rotates as the helix revolves so that it is 180 degrees from the axis 16, is fixed at the bottom of the three illustrations and, instead, the rotation of the coil units is indicated by the curved arrows 20. FIG. 4 shows the motion of a small amount of the lower heavier phase 18 in the lighter upper phase 17. If the relative centrifugal force, $R\omega^2$, is strong enough to keep the lower phase near the bottom 23 (the outside of the helix in actual practice) at all times, the lower phase will move steadily toward the head end of the coil at angular velocity $\omega$.

In the present system, the centrifugal force usually fails to fix the lower phase 18 which subsequently appears at any portion of the coil unit. When the lower phase 18 appears at the left half 21 of the schematic illustrated coil, it ends to move toward the head, while at the right half 22, it moves toward the tail (the bottom of the helix in actual practice). Because the lower phase 18 tends to spend more time in the left half 21, these two motions do not cancel out and the lower phase 18 moves toward the head with an oscillatory motion at a mean angular velocity smaller than $\omega$.

FIG. 5 illustrates the motion of a small amount of the upper phase 17 in the lower phase 18. With a strong centrifugal force, the upper phase 17 could be fixed near the top 26 of the schematic illustrated coil unit, constantly moving toward the head of the coil. When the centrifugal force fails to fix the upper phase 17, the latter moves toward the head at the right half 24 and toward the tail at the left half 25 of the coil unit. However, these motions again do not cancel out, and the upper phase also moves toward the head.

When a similar volume of the two phases is introduced into the tube, the motion of the phase becomes quite complex but finally reaches an equilibrium state illustrated in FIG. 6. At the equilibrium, the multiple segments of the two phases are alternately arranged from the head to the tail side, and any excess of either phase remains at the tail. Consequently, this phenomenon determines the proper direction of elution.

When the tube is filled with either phase and the other is introduced from the head, the equilibrium process is quickly established from the head through the tail as elution proceeds and a given volume of the stationary phase is held within the equilibrated coil 11 (FIG. 2). On the other hand, introduction of the flow through the tail results in a steady carry over of the stationary phase until the moving phase fills the entire column. Thus, the moving phase should be fed from the head end, determined by both handedness of the coil and direction of the planetary motion. Consequently, a sample solution introduced into the tube is subjected to a partition process between the oscillating alternate segments of the two phases and finally eluted out through the tail end of the coil.

Figure 1:
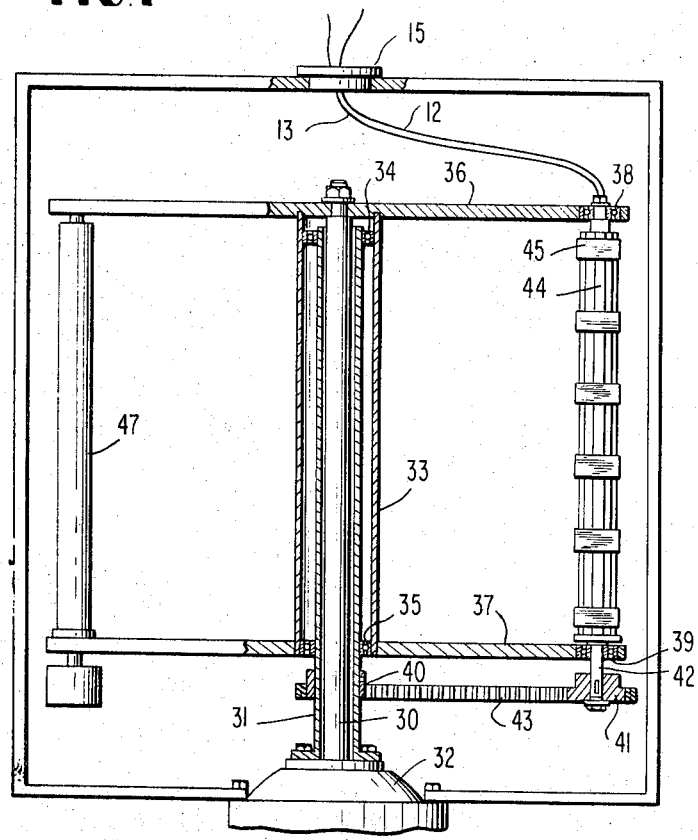
FIG. 1 is an elevational view partly in cross-section of the flow-through coil planet centrifuge of the present invention.

An adequate centrifugal force to form the two phases into multiple segments in a small bored tubing without plug flow is provided by the centrifuge of FIG. 1. A motor shaft 30, extending through a stationary tube 31 mounted to a motor housing 32, is connected to a rotating tube 33 that fits freely over the stationary tube 31 with bearings 34 and 35 at the top and bottom. A pair of arms 36 and 37 fixed to the top and bottom of the rotating tube 33 support a rotating coil holder 42 through bearings 38 and 39. A pair of toothed wheels 40 and 41 of the same size are fixed, respectively, near the bottom of the stationary tube 31 and the bottom of the coil holder 42 and are connected by a toothed drive belt 43. Revolution of the centrifuge introduces the desired planetary motion to the coil holder 42—i.e., one rotation per revolution in the opposite direction.

The helical column may be made of suitable tubing such as polytetrafluoroethylene tubing either by winding the tube onto the coil holder 42 or by arranging multiple coil units 44 interconnected in a series by a tail-to-head connection; several separate parallel columns may be provided around the holder 42. FIG. 1 shows several tightly wound helical coils 44 arranged around coil holder 42 and connected in series. The columns 44 are attached to the coil holder 42 by any suitable means such as tape 45. Both feed and return tubes 12 and 13 are passed through holes at the top of the coil holder 44 and then supported above the center of the apparatus by the dish ---
[1] Described in "Countercurrent Chromotography With Flow-Through Coil Planet Centrifuge," Ito and Bowman, Science, Aug. 2, 1971, and hereby incorporated by reference.

15 in turn supported by suitable means. The feed and return tubes may then be attached to any desired analytical mechanisms.

A counterweight 47 or another helix may be affixed to the opposite side of the centrifuge. The test system depicted in FIG. 1 has a radius of revolution of 30.7 cm. and uses a 0.30 mm. bore Teflon tubing 100 meters long with a helix diameter of 5 mm. and a total capacity of about 8 ml.

With a relatively large bore tubing, a strong centrifugal force field may produce multiple droplets of either phase in the other. The picture of this hydrodynamic phase equilibrium may be modified by various factors such as viscosity, interfacial tension, wall surface affinity, density difference of the two phases, etc., and for some solvent systems, the ideal condition may be obtained by using an even greater radius of revolution than that used in the present test system.

The apparatus of the present exemplification was tested for the separation of nine DNP amino acids using a sample size of 10 microliters containing each component at about 1% where solubility permits. The upper phase is fed with a metering pump at a rate of 2.4 ml. per hour while the apparatus is spun at 550 r.p.m., the equilibrium feed pressure being approximately 200 p.s.i. The efficiency ranges between 10,000 and 3,000 TP (theoretical plates), showing a tendency to decrease with increased retention time.

The present system developed for countercurrent chromatography shows high reproducibility and meets preparative and analytical needs. Compared with the countercurrent distribution method, countercurrent chromatography practically yields more theoretical plates and reduces the degree of sample dilution occurring during separation. The time required for separation is also lessened considerably. The value of countercurrent chromatography analogous to one transfer time in countercurrent distribution method, obtained by dividing the retention time of the solvent front by the yielded theoretical plate number is only 1 second using the flow-through coil planet centrifuge technique of the present invention, whereas in the countercurrent distribution method one transfer requires several minutes. Thus, the present method is suitable for preparation of samples on the order of 10 mg., which is just enough to complete most biochemical investigations. The present invention furthermore eliminates complications arising from the use of solid supports in conventional partition chromatography, hence tailing of the solute peaks, sample loss, denaturation, and contamination are minimized. Also, this method enables one to predict locations of the eluted solvent peaks once their partition coefficients are known. Thus, it is extremely useful for purification of a minute amount of biological material from a crude mixture.

It will be obvious to those skilled in the art that various changes may be made without departing from the scope of the invention and the invention is not to be considered limited to what is known in the drawings and described in the specification.

What is claimed is:
1. A flow-through coil planet centrifuge, comprising:
   a helical tube;
   a feed tube and a return tube connected to the ends of said helical tube;
   centrifugation means attached to said helical tube for revolving said helical tube about an axis of revolution and rotating said helical tube in the opposite direction at the rate of one rotation per revolution; and
   a stationary holding means located outside said centrifugation means on said axis of revolution for holding said feed and return tubes;
   whereby in operation the orientation of said helical tube will remain constant and said feed and return tubes will not twist.

2. A flow-through coil planet centrifuge as described in claim 1 wherein:
   said centrifugation means comprises a drive shaft at said axis of revolution; a tube holder for supporting said helical tube; arm means for connecting said tube holder to said drive shaft, maintaining said tube holder at a predetermined distance therefrom and permitting said tube holder to rotate freely on its own axis; a first pulley concentric with said axis of revolution and held in a fixed position; a second pulley fixedly connected to said tube holder and having the same diameter as said first pulley; and a belt means connecting said first and second pulleys.

3. A flow-through coil planet centrifuge in accordance with claim 2 wherein said centrifugation means further include:
   a stationary support tube surrounding said drive shaft; and a rotating tube surrounding said stationary support tube and connected to said arm means so as to be rotatable about said stationary support tube in response to rotation of said drive shaft; wherein said first pulley is fixed to said stationary support tube.

4. A flow-through coil planet centrifuge in accordance with claim 1, further including:
   a movable holding means fixedly connected to said tube holder for holding said feed and return tubes in a fixed orientation with respect to said tube holder.

5. A flow-through coil planet centrifuge in accordance with claim 1, wherein:
   said helical tube is wrapped about said tube holder such that said tube holder is at the axis of said helical tube.

6. A flow-through coil planet centrifuge in accordance with claim 1, further including:
   at least one more helical tube; wherein said helical tubes are connected to the periphery of said tube holder and said tubes are connected to one another in series.

7. A flow-through coil planet centrifuge in accordance with claim 2, wherein:
   said first and second pulleys are toothed pulleys and said belt means is a toothed belt.

8. A method of countercurrent chromatography comprising:
   filling a helical tube with a first solvent;
   centrifuging said filled helical tube around an axis of revolution remote from the axis of the helical tube and simultaneously rotating said helical tube about the axis thereof in a direction opposite from the direction of centrifugation and at a rate of one rotation per revolution;
   introducing a sample solute to be separated into the moving helical tube;
   pumping a second solvent, immiscible with said first solvent into the moving helical tube; and
   recovering the separated solute fractions leaving said helical tube.

9. A method in accordance with claim 8 wherein said first solvent is heavier than said second solvent.

10. A method in accordance with claim 8 wherein said first solvent is lighter than said second solvent.

References Cited

UNITED STATES PATENTS

| | | | |
|---|---|---|---|
| 3,077,103 | 2/1963 | Heaton | 55—67 X |
| 3,507,147 | 4/1970 | Llewellyn | 55—67 X |
| 3,666,105 | 5/1972 | Fox | 210—198 C |
| 3,706,383 | 12/1972 | Palma | 210—512 X |

JOHN ADEE, Primary Examiner

U.S. Cl. X.R.

210—198 C, 511